(12) United States Patent
Sridharan et al.

(10) Patent No.: US 9,026,847 B2
(45) Date of Patent: May 5, 2015

(54) HARDWARE BASED REDUNDANT MULTI-THREADING INSIDE A GPU FOR IMPROVED RELIABILITY

(71) Applicant: Advanced Micro Devices, Inc., Sunnyvale, CA (US)

(72) Inventors: Vilas Sridharan, Brookline, MA (US); Sudhanva Gurumurthi, Watertown, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 194 days.

(21) Appl. No.: 13/724,968

(22) Filed: Dec. 21, 2012

(65) Prior Publication Data

US 2014/0181587 A1    Jun. 26, 2014

(51) Int. Cl.
*G06F 11/00*    (2006.01)
*G06F 11/07*    (2006.01)

(52) U.S. Cl.
CPC ................................ *G06F 11/0778* (2013.01)

(58) Field of Classification Search
CPC .............................. G06F 11/0778; G06F 11/07
USPC ...................................... 714/11, 10, 12, 13, 37
See application file for complete search history.

(56) References Cited

U.S. PATENT DOCUMENTS

| | | | |
|---|---|---|---|
| 6,499,048 B1 * | 12/2002 | Williams | 718/102 |
| 7,043,728 B1 * | 5/2006 | Galpin | 718/102 |
| 8,773,446 B2 * | 7/2014 | Gnanasambandam et al. | 345/505 |
| 2005/0071336 A1 * | 3/2005 | Najork et al. | 707/8 |
| 2011/0246823 A1 * | 10/2011 | Khan et al. | 714/16 |

* cited by examiner

*Primary Examiner* — Dieu-Minh Le
(74) *Attorney, Agent, or Firm* — Volpe and Koenig, P.C.

(57) ABSTRACT

A system and method for verifying computation output using computer hardware are provided. Instances of computation are generated and processed on hardware-based processors. As instances of computation are processed, each instance of computation receives a load accessible to other instances of computation. Instances of output are generated by processing the instances of computation. The instances of output are verified against each other in a hardware based processor to ensure accuracy of the output.

27 Claims, 7 Drawing Sheets

HARDWARE BASED REDUNDANT MULTI-THREADING INSIDE A GPU FOR IMPROVED RELIABILITY

STATEMENT REGARDING FEDERALLY-SPONSORED RESEARCH AND DEVELOPMENT

This invention was made with U.S. Government support under Prime Contract Number DE-AC52-07NA27344, Subcontract Number B600716 awarded by the Department of Energy (DOE). The Government has certain rights in this invention.

BACKGROUND

1. Field

The embodiments are generally directed to data verification using redundant computations, and more specifically to data verification using hardware-based redundant computations.

2. Background Art

There are several approaches to data verification through fault tolerance, in particular information redundancy, spatial redundancy and temporal redundancy. Information redundancy uses coding techniques, such as parity and error correction codes to detect and recover from data errors. Spatial redundancy duplicates the hardware that requires protection. Temporal redundancy involves replicating computations and running the replicated computations on the same hardware.

Fault tolerance through redundant computation may be used in central processing units ("CPUs"). However, redundant computations on the CPUs impose significant performance overhead due to CPUs' limited ability to process data in parallel.

Some redundant execution may occur on the graphics processing units ("GPUs"). For example, adjacent single instruction multiple data lanes ("SIMD" lanes) may be replicated in hardware and their outputs compared prior to the output being updated in the system memory.

BRIEF SUMMARY OF EMBODIMENTS

A system and method for verifying computation output using computer hardware are provided. Instances of computation are generated and processed on hardware-based processors. As instances of computation are processed, each instance of computation receives a load accessible to other instances of computation. Instances of output are generated by processing the instances of computation. The instances of output are verified against each other in a hardware-based environment to ensure accuracy of the output.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
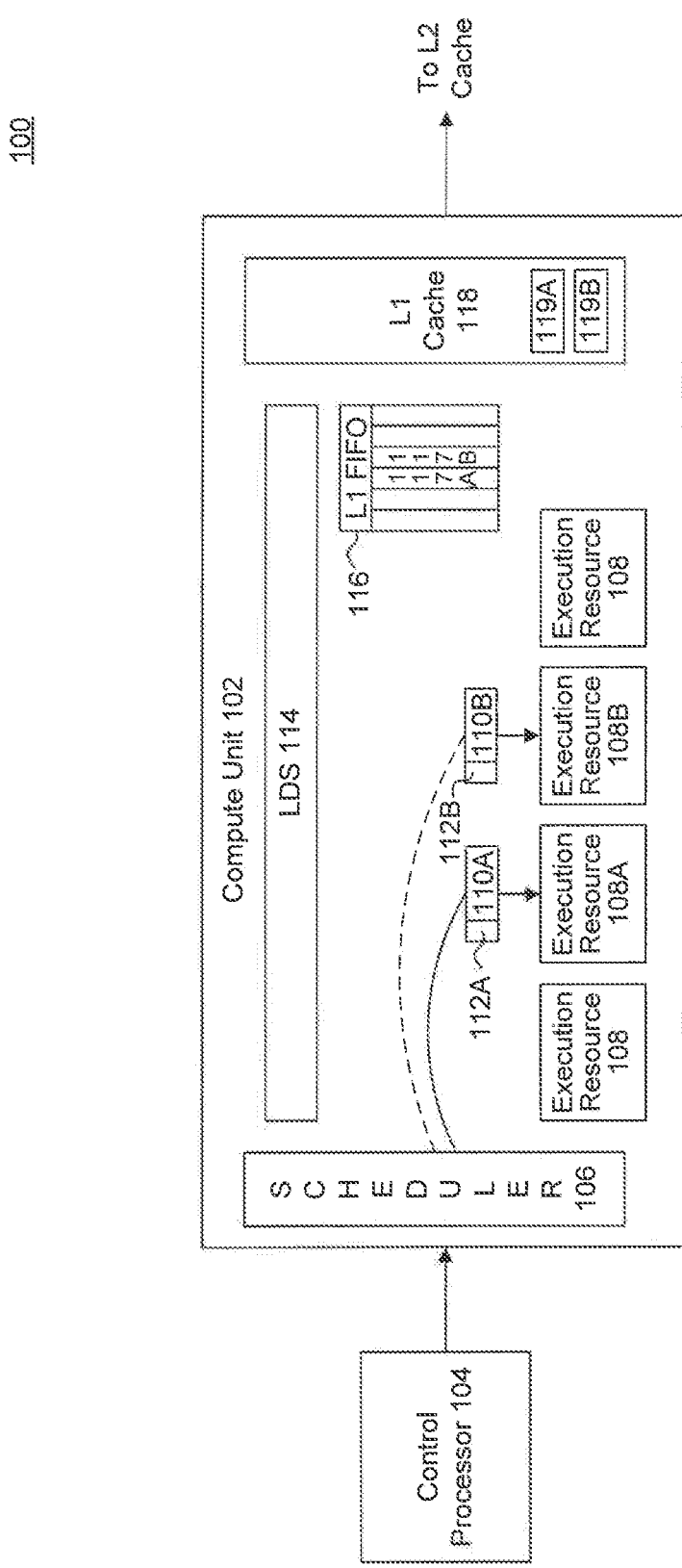
FIG. 1 is a block diagram of redundant computation hardware in a compute unit, according to an embodiment.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Electronic devices process data and provide thousands of applications to users. Example electronic devices include, but are not limited to, mobile phones, personal computers, workstations, and game consoles. Conventional electronic devices use a central processing unit ("CPU") to process data. A CPU is a processor which carries out instructions of computer programs or applications. For example, a CPU carries out instructions by performing arithmetical, logical and input/output operations of the computer programs or applications. In an embodiment, the CPU performs sequential processing, that may include control instructions that include decision making code of a computer program or an application, and delegates processing to other processors in the electronic device, such as a graphics processing unit ("GPU").

A GPU is a processor that is a specialized electronic circuit designed to rapidly process mathematically intensive applications on electronic devices. The GPU has a highly parallel structure that is efficient for parallel processing of large blocks of data, such as mathematically intensive data of the computer graphics applications, images and videos. The GPU may receive data for processing from a CPU or generate data for processing from previously processed data and operations. In an embodiment, the CPU is a hardware-based processor that uses hardware to process data in parallel.

Due to the advances in technology, a GPU also performs general purpose computing (also referred to as GPGPU computing). In the GPGPU computing, a GPU performs computations that traditionally were handled by a CPU. When the GPGPU computing is used in large scale systems to process data, a GPU needs to tolerate computational faults without causing application errors and system crashes. In an embodiment, the fault tolerance mechanism may be implemented without introducing significant changes to the existing architecture of the GPU.

In an embodiment, a GPU includes one or more compute units that process data. A compute unit includes arithmetic logic units (ALU's) and other resources that process data on the GPU. Data can be processed in parallel within and across compute units.

In an embodiment, a control processor on a GPU schedules tasks processing on compute units. Tasks include computation instructions. These computation instructions may access data stored in the memory system of an electronic device and manipulate the accessed data. In an embodiment, the data may be stored in a volatile or non-volatile memory. Example volatile memory includes a random access memory (RAM). Volatile memory typically stores data as long as electronic device receives power, as described above. Example non-volatile memory includes read-only memory, flash memory, ferroelectric RAM (F-RAM), hard disks, floppy disks, magnetic tape, optical discs, etc. Non-volatile memory retains its memory state when the electronic device loses power or is turned off.

To ensure computational reliability of data, the GPU performs data verification using computational redundancy. Computational redundancy in hardware may be performed at various points in the GPU as the GPU processes data.

1. REDUNDANT VERIFICATION IN THE COMPUTE UNIT (a) System

FIG. 1 is a block diagram 100 of a system that performs data verification within a compute unit, according to an embodiment. A compute unit 102 included in FIG. 1 is located within a GPU, although an implementation is not limited to this embodiment.

Compute unit 102 receives and processes tasks scheduled for processing by control processor 104. As described above, control processor 104 may receive tasks from a CPU or a GPU executing on the electronic device. Control processor 104 divides tasks into multiple workgroups. Each workgroup includes multiple wavefronts. A wavefront includes multiple threads, where each thread can execute in parallel with other threads on compute unit 102. Threads include executable code/instructions and that are processed by execution resources 108. There may be 64 threads in a wavefront, although the implementation is not limited to this embodiment. When compute unit 102 receives workgroups, compute unit 102 processes the code in the wavefronts.

Compute unit 102 includes a scheduler 106, execution resources 108, a memory buffer implemented as level one FIFO 116 ("L1 FIFO 116"), and a memory cache implemented as level one read/write cache 118 ("L1 cache 118").

Scheduler 106 in compute unit 102 schedules workgroups for processing on execution resources 108. Execution resources 108 are implemented in hardware and may be arithmetic logic units (ALUs) that include one or more single instruction multiple data units (SIMD units), scalar units, branch units and memory units. To improve computational reliability, scheduler 106 includes hardware that creates multiple instances of computation included in each workgroup. In an embodiment, these instances include the same code. These instances are referred to as instances of computation or computations 110. For example, in FIG. 1, scheduler 106 creates two instances of computation 110, such as computations 110A and 110B.

To differentiate between instances of computation 110, scheduler 106 creates a distinguishing tag 112, and associates tag 112 with each instance of computation 110. Example tags 112 are tag 112A for computation 110A and tag 112B for computation 110B.

In an embodiment, tag 112 may be a single bit tag. In this embodiment, tag 112A may be set to "1" and tag 112 may be set to "0".

Tags 112 associated with instances of computation 110 also indicate an instance of computation 110, such as 110A or 110B that is a primary or leading instance. In an embodiment, a primary instance of computation 110 updates memory subsequent to a successful verification.

Execution resources 108 process instances of computation 110. For example, in FIG. 1, execution resource 108A may process computation 110A and execution resources 108B may process computation 110B.

Execution resources 108 execute each instance of computation 110 until a predetermined verification point. Once instances of computation 110 reach the predetermined verification point, compute unit 102 uses verification hardware to verify that the output generated by instances of computation 110 is the same. If the output in the instances of computation 110 is verified, compute unit 102 propagates the primary instance of computation 110 to the system memory. If the output generated by instances of computation 110 is not verified, compute unit 102 raises an exception and initiates a recovery action. An example recovery action may restore the state of all instances of computation 110 to a previously verified checkpoint, and re-execute the instances of computation 110 from the previously verified checkpoint.

Compute units 102 may verify output generated using instances of computation 110, (such as computation 110A and 110B), using different hardware. When execution resources 108 process instances of computation 110, execution resources 108 may retrieve input data from the memory system (also referred to as a load) and issue output for storage in a memory system (also referred to as a store). The output includes data and a storage address in the memory system that stores the data.

Execution resources 108 may store the loads and stores in L1 FIFO 116. L1 FIFO 116 is a memory buffer that may be implemented as a queue, though an implementation is not limited to this embodiment. L1 FIFO 116 connects to L1 cache 118 on compute unit 102. In FIG. 1, the output from instances of computation 110 stored in L1 FIFO 116 is referred to as output 117, and output generated by computations 110A and 110B is referred to as output 117A and 117B, respectively. The output stored in L1 FIFO 116 may be subsequently stored in L1 cache 118.

In an embodiment, L1 cache 118 may also store loads required to process instances of computation 110 on execution resources 108, and stores generated by instances of computation 110. The loads may be stored in L1 cache 118 until the loads are consumed by execution resources 108. The stores stored in L1 cache 118 are referred to as output 119, and stores generated by computations 110A and 110B is referred to as output 119A and 119B, respectively.

The stores may be stored in L1 FIFO 116 or L1 cache 118 before they permanently update the memory system or are accessed by other processors on the electronic device. For example, a GPU may store data in the L1 FIFO 116 or L1 cache 118 of compute unit 102 and forward the stores to an L2 cache (described below), combine data with the data from other compute units executing on the GPU, forward the data to other processors executing on the electronic device, or store the data in a long term storage to give a few examples.

In an embodiment, verification of loads and stores for instances of computation 110 may occur either in L1 FIFO 116 or in L1 cache 118.

In an embodiment, L1 FIFO 116 and L1 cache 118 may include volatile or non-volatile memory, described above.

In one embodiment, compute units 102 also include a local data store 114 ("LDS" 114.) LDS 114 is a memory structure local to compute unit 102. In an embodiment, LDS 114 is controlled by software. Additionally, LDS 114 may be used to temporarily store data generated during processing of instances of computation 110.

(i) Verification in Level One FIFO in an embodiment, verification in L1 FIFO 116 occurs when loads associated with instances of computation 110 are retrieved from the memory system and when stores for the memory system are generated by instances of computation 110.

When instances of computation 110 execute on execution resources 108 they are fed the same loads (input data) from the memory system to ensure redundancy. When one instance of computation 110 issues a request for a load to the memory system, the load is retrieved from the memory system and is buffered and stored (also referred to as pinned) in L1 FIFO 116. The load is pinned in L1 FIFO 116 until other instances of computation 110 issue a request for the same load. Once other instances of computation 110 issue the request for the load, the load in L1 FIFO 116 is forwarded to execution resources 108 that process the requesting instances of computation 110. After all instances of computation 110 process the load (also referred to as "consume the load"), compute unit 102 releases the load from L1 FIFO 116.

For example, computation 110A in FIG. 1 requests a load from the memory system. In response to the request, the load is retrieved and pinned in L1 FIFO 116, and is also forwarded to execution resource 108A. The load is pinned in L1 FIFO 116 until computation 110B requests the load. When computation 110B requests the same load, the load is forwarded to execution resource 108B. Once computation 110B consumes the load, the load is unpinned and removed from L1 FIFO 116.

When instances of computation 110 execute on execution resources 108, instances of computation 110 generate stores. These stores are stored in L1 FIFO 116 as output 117. For example, an instance of computation 110 generates a corresponding instance of output 117. Output 117 remains in L1 FIFO 116 until it is verified against other instances of output 117 generated by instances of computation 110. Compute unit 102 identifies instances of output 117 generated by instances of instances of computation 110 according to tags 112. Once verification completes, output 117 may be removed from L1 FIFO 116 and a primary instance of output 117 is propagated to the memory system.

For example, when computation 110A executes on execution resource 108A it issues an instance of output that is stored in L1 FIFO 116 as output 117A. Output 117A may be stored in L1 FIFO 116 until computation 110B executing on execution resource 108B issues the output that is stored in L1 FIFO 116 as output 117B. When output 117A and output 117B are stored in L1 FIFO 116, compute unit 102 identifies that output 117A and output 117B were generated by the same redundant instances of computation 110A and 110B using tags 112A and 112B, and verifies outputs 117A and 117B. Compute unit 102 then verifies that data and memory addresses that store the data in outputs 117A and 117B are the same. When the verification succeeds, the output associated with the primary instance of computation 110 is stored in L1 cache 118, which propagates the output to a memory system.

In an embodiment, a memory system (not shown) may be volatile or non-volatile memory storage accessible to different processors in the electronic device, such as a GPU and a CPU.

(ii) Verification in Level One Cache

In an embodiment, verification in L1 cache 118 occurs when the loads used by instances of computation 110 are retrieved from the memory system and when stores generated by instances of computation 110 are stored in L1 cache 118. In this embodiment, the stores associated with each computation 110 are propagated through L1 FIFO 116 for verification in L1 cache 118.

As discussed above, when an instance of computation 110 issues a request for a load to the memory system, the load is retrieved from the memory system and is pinned in L1 cache 118. The load is pinned in L1 cache 118 until other instances of computation 110 issue request for the load and subsequently consume the load.

For example, computation 110A requests a load from the memory system. In response to the request, the load is retrieved and pinned in L1 cache 118, and is also forwarded to execution resource 108A. When computation 110B requests the same load, the load is accessed in L1 cache 118 and is forwarded to execution resource 108B. Once computations 110A and 110B consume the load, the load is unpinned and removed from L1 cache 118.

In another embodiment, the stores produced by instances of computation 110 are verified in L1 cache 118. In FIG. 1, the stores are stored in L1 cache 118 as output 119 until verification succeeds or fails.

For example, when computations 110A and 110B execute on execution resources 108A and 108B, they issue output that is stored in L1 cache 118 as output 119A and output 119B. Once output 119A and output 119B are stored in L1 cache 118, compute unit 102 verifies output 119A against output 119B, in a manner similar to the verification in L1 FIFO 116. For example, compute unit 102 identifies that output 119A and output 119B are outputs generated using computations 110A and 110B based on tags 112A and 112B, and verifies output 119A against output 119B. As described above, the verification may include a comparison of data and storage addresses stored in output 119A and 119B. If the verification is successful, output 119A or output 119B (whichever is designates as primary) is propagated to level two cache (L2 cache), described below and to the memory system of the electronic device.

(b) Methods

Figure 2:
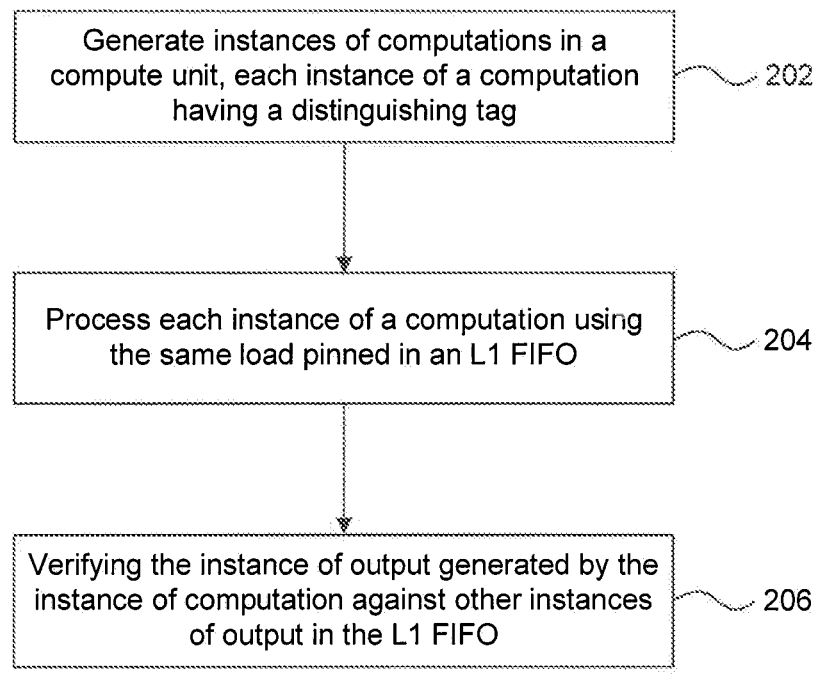
FIG. 2 is a flowchart of a method for verifying instances of computation in a buffer leading to a memory cache of a compute unit, according to an embodiment.

FIG. 2 is a flowchart of a method 200 for verifying instances of computation in a buffer leading to a memory cache of a compute unit, according to an embodiment.

At operation 202, instances of computation are generated. For example, scheduler 106 generates instances of computation 110, where each computation 110 has a distinguishing tag 112.

At operation 204, instances of computation are processed. For example, each instance of computation 110 is processed by a respective execution resource 108 in compute unit 102. During processing, a load requested by the one computation 110 may be pinned in L1 FIFO 116 until loads are requested and consumed by other instances of computation 110. During processing, stores issued by instances of computation 110 are stored in L1 FIFO 116.

At operation 206, an output generated by the computations is verified. For example, the data and storage address of instances of output 117 of each instance of computation 110 are verified against instances of output 117 of other instances of computation 110 in L1 FIFO 116. Instances of output 117 from instances of computation 110 are pinned in L1 FIFO 116 until verification completes. When the verification is successful, compute unit 102 dispatches a primary instance of output 117 for storage in L1 cache 118 and onward to the memory system of the electronic device.

Figure 3:
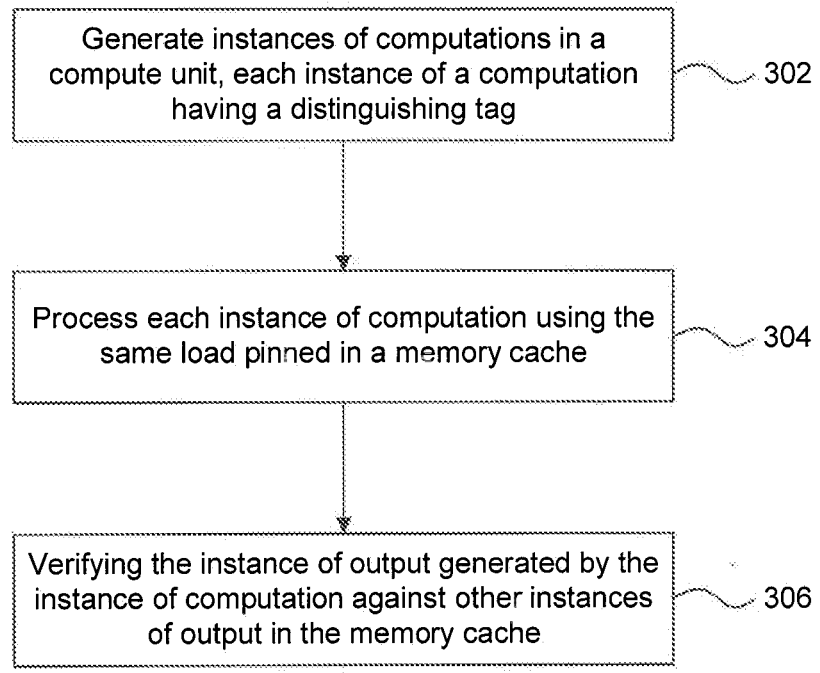
FIG. 3 is a flowchart of a method for verifying instances of computation in a memory cache of a compute unit, according to an embodiment.

FIG. 3 is a flowchart of a method 300 for verifying redundant computations in a memory cache of a compute unit, according to an embodiment.

At operation 302, instances of computation are generated. For example, scheduler 106 generates instances of computation 110, where each computation has a distinguishing tag 112.

At operation 304, instances of computation are processed. For example, each instance of computation 110 is processed by a respective execution resource 108 on compute unit 102. During the processing, a load requested by the one computation 110 may be pinned in L1 cache 118 until the same load requests are issued and consumed by other instances of computation 110. During processing, stores issued by instances of computation 110 are stored in L1 cache 118.

At operation 306, an output generated by the instances of computation is verified. For example, the data and storage address of instances of output 119 of each instance of computation 110 are verified against instances of output 119 of other instances of computation 110 in L1 cache 118. Instances of output 119 from instances of computation 110 are pinned in L1 cache 118 until verification completes. When the verification is successful, compute unit 102 dispatches a primary instance of output 119 for storage in L2 cache and onward to the memory system of the electronic device.

2. REDUNDANT VERIFICATION USING MULTIPLE COMPUTE UNITS (a) System

Figure 4:
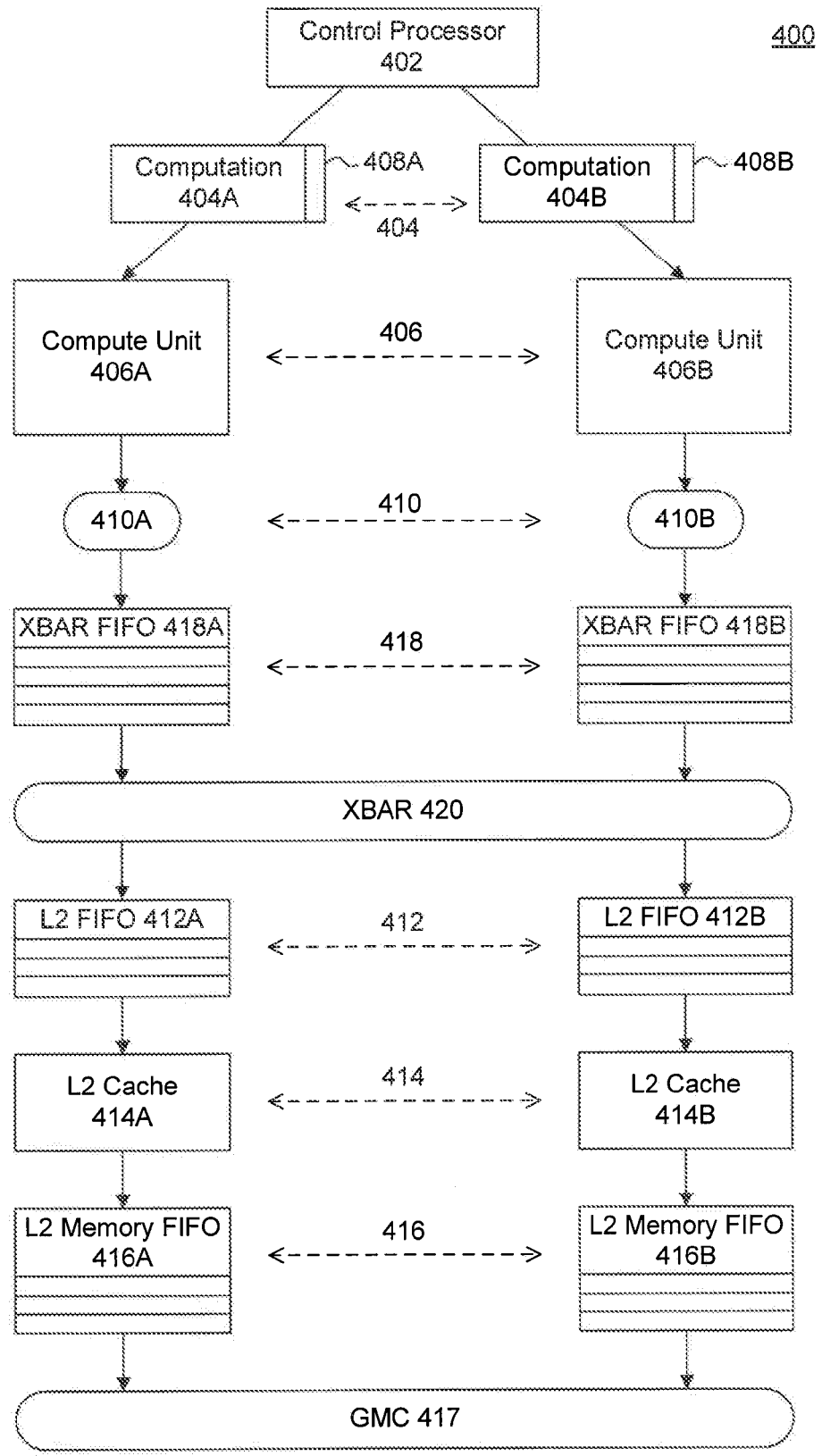
FIG. 4 is a block diagram of a redundant computation hardware using compute units, according to an embodiment.

FIG. 4 is a block diagram 400 of a system for performing data verification using multiple compute units, according to an embodiment.

Block diagram 400 includes a control processor 402, similar to a control processor 104 described above. Additionally, to perform data verification using multiple compute units 406, control processor 402 divides tasks into multiple workgroups. Control processor 402 then generates instances of computation 404 for each workgroup, and dispatches each instance of computation 404 for processing on a different compute unit 406. For example, control processor 402 may generate two instances of computation 404, such as computation 404A and computation 406B. Once generated, control processor 402 dispatches computation 404A for processing on compute unit 406A and computation 404B on compute unit 406B.

As discussed in FIG. 1, instances of computation 404 are distinguished using tags 408. Tag 408 may be a single bit that is appended to each computation 404, in one embodiment. For example, in FIG. 2, tag 408A is associated with computation 404A, and tag 408B is associated with computation 404B. In an embodiment, a bit in tag 408 may also identify a primary instance of computation 404. As discussed below, the output of the primary instance of computation 404 may update the memory system when verification completes.

Compute unit 406 includes hardware and memory for processing instances of computation 404. Each compute unit 406 process an instance of computation 404 independently of other compute units 406 that process other instances of computation 404. For example, compute unit 406A processes computation 404A independently of compute unit 406B that processes computation 404B.

Instances of computation 404 generate instances of output 410. Instances of output 410 are verified in the GPU before the data in the output is accessible to other processors in the electronic device. If the verification is successful (for example the output of computation 404A is the same as the output of computation 404B) the primary instance of output 410 updates the memory system. If the verification fails, GPU raises an exception and initiates a recovery action. In one embodiment, a recovery action restores the state of computations 404A and 404B to a previously successful verification point.

To ensure that compute units 406 produce the same output when compute units 406 process different instances of computation 404, each compute unit 406 processes instances of computation 404 using the same load. For example, compute unit 406A receives the same load for processing computation 404A, as compute unit 406B for processing computation 404B.

Once compute units 406 complete processing instances of computation 404, instances of output 410 generated by computations 404, such as output 410, may be verified at different points in the GPU. Once verified, output 410 queued for storage in a memory system by a graphics memory controller 417 (also referred to as GMC 417). To reach GMC 417, output 110 passes through a level two FIFO 412 (also referred to as L2 FIFO 412), a level two cache 414 (also referred to as L2 cache 414) and level two memory FIFO 416 (also referred to as L2 memory FIFO 416.) In an embodiment, verification may occur in L2 FIFO 412, L2 cache 414 and L2 memory FIFO 416.

(i) Verification in Level Two FIFO

L2 FIFO 412 is a memory buffer that includes volatile memory. L2 FIFO 412 queues instances of output 410 produced by compute units 406 prior to storing instances of output 410 in L2 cache 414. In an embodiment, there are multiple L2 FIFOs 412 that connect to L2 cache 414. When output 410 leaves compute unit 406, output 410 may be queued in memory buffers, such as XBAR FIFOs 418. XBAR FIFOs 418 store data that is queued for transmission through a cross bar 420 (also referred to as XBAR 420) to one of L2 FIFOs 412. Cross bar 420 is a switch that routes instances of output 410 to a particular L2 FIFO 412.

Each L2 FIFO 412 stores data for a particular section of L2 cache 414. For example, L2 cache 414 in a GPU may be divided into multiple sections. Each section of L2 cache 414 corresponds to a particular address range in the memory system. Each L2 FIFO 412 is a buffer that stores output 410 that accesses (either reads from or writes to) data in a particular section of L2 cache 414.

When output 410 associated with each instance of computation 404 arrives in L2 FIFO 412, a GPU stores each output 410 in L2 FIFO 412 until other instances of output 410 arrive in L2 FIFO 412. When all instances of output 410 generated by instances of computation 404 arrive in L2 FIFO 412, the GPU uses verification hardware to verify that content of each instance of output 410 is the same as the content of other instances of output 410. In an embodiment, as part of the verification, the GPU verifies the data and storage address of each instance of output 410 with other instances of output 410. As described above, instances of output 410 associated with instances of computation 404 may be identified using tags 408. If the verification is successful, output 410 identified as a primary output 410 stores its data in L2 cache 414.

For example, in FIG. 2, outputs 410A and 410B may be stored in L2 FIFO 412A and L2 FIFO 412B, respectively, after passing through XBAR 420. When output 410A arrives in L2 FIFO 412A before output 410B arrives in L2 FIFO 412B, the GPU stores output 410A in L2 FIFO 412A until output 410B arrives in L2 FIFO 412B. When output 410B arrives in L2 FIFO 412B, the GPU verifies data and the storage address of data included in output 410A with output 410B. If the verification is successful, the GPU propagates output 410A or output 410B (whichever is designated as a primary output using tag 408) in L2 cache 414.

Additionally, L2 FIFO 412 may store loads consumed by computations 404 executing on compute units 406 (not shown). A load is stored in L2 FIFO 412 when one instance of computation 404 requests the load from the memory system. The requested load is stored in L2 FIFO 412 until all computations 404 on compute units 406 consume the load. For example, computations 404A and 404B may require a load while they execute on compute units 406A and 406B. When the load is requested by either computation 404A or 404B, the load is pinned in L2 FIFO 412. Moreover, subsequent requests for the load will cause the GPU to retrieve the load from L2 FIFO 412 and not the memory system. Once computations 404A and 404B consume the load, the GPU may remove the load from L2 FIFO 412.

(ii) Verification in Level Two Cache

In another embodiment, verification may occur in L2 cache 414. L2 cache 414 includes volatile or non-volatile memory. When verification occurs in L2 cache 414, GPU propagates instances of output 410 generated from instances of computation 404 to L2 cache 414. In this embodiment, instances of output 410 may be stored in the same section of L2 cache 414.

Once instances of output 410 are stored in L2 cache 414, L2 cache 414 verifies the content, such as data and storage addresses in the instances of output 410. If the verification is successful, a primary instance of output 410 is propagated to L2 memory FIFO 416. An L2 memory FIFO 416 is a memory buffer in the GPU that stores output 410 before output 410 is stored in the permanent storage using GMC 417.

For example, in FIG. 4, when output 410A arrives in L2 cache 414 prior to output 410B, the GPU stores output 410A in L2 cache 414A until output 410B arrives in L2 cache 414B. When output 410B arrives in L2 cache 414, the GPU verifies data and the storage address of data included in output 410A and output 410B. If the verification is successful, the GPU propagates output 410A or output 410B (whichever is designated as a primary output using tag 408) to L2 memory FIFO 416.

In an embodiment, data in L2 cache 414 in the GPU may also be accessed by other processors, such as a CPU. The data in the verified output 410 is accessible to those processors while it is stored in L2 cache 414. However, to prevent other processors from accessing data in outputs 410 that was not verified, output 410 in L2 cache 414 is not architecturally visible to other processors unit verification completes.

In an embodiment, L2 cache 414 may also store loads that are consumed by instances of computation 404 executing on compute unit 406 (not shown). When a load is stored in L2 cache 414, the load is stored until all instances of computation 404 consume the load. For example, instances of computation 404A and 404B may request a load while they execute on compute unit 406A and 406B. The requested load is retrieved from the memory storage and is pinned in L2 cache 414 until computations 404A and 404B consume the load. Moreover, subsequent requests for the load by other instances of computation 404 will cause the GPU to retrieve the load from L2 cache 414 and not the system memory. Once computations 404A and 404B consume the load, the GPU may remove the load from L2 cache 414.

(iii) Verification in L2 memory FIFO

In an embodiment, verification may also occur in L2 memory FIFO 416. L2 memory FIFO 416 includes volatile memory. As described above, L2 memory FIFO 416 includes output 410 that GMC 417 stores in the memory system. Each L2 memory FIFO 416 may be associated with a different section of the memory system and may receive output 410 from a different section in L2 cache 414.

In an embodiment, to perform verification in L2 memory FIFO 416, the GPU ensures that instances of output 410 are stored in different memory locations in L2 cache 414. For example, output 410A may be stored in the section associated with L2 cache 414A and output 410B may be stored in the section associated with L2 cache 414B. Storing different instances of output 410 in different sections of L2 cache 414 ensures that different instances of output 410 are not stored in the same memory address in L2 memory FIFO 416.

To ensure that instances of output 410 are stored in different sections of L2 cache 414, a GPU may leverage an aperture in the 64-bit memory address space in L2 cache 414 by appending tag 408 that identifies different instances of output 410 in the aperture. A person skilled in the art will appreciate that an aperture in the 64-bit memory address space is a flee space that may store one or more memory bits. Thus, when different instances of output 410 reference the same address in L2 cache 414, the GPU generates a different actual address for each instance of output 410 by including tag 408 of each instance of output 410 in the physical address calculation.

Once instances of output 410 are stored in L2 memory FIFO 416, the GPU verifies the data and storage addresses stored in instances of output 410. If the verification is successful, the primary instance of output 410 is stored in the memory system by the GMC 417.

For example, in FIG. 4, output 410A arrives in L2 memory FIFO 416A prior to output 410B arriving in L2 memory FIFO 416B, the GPU stores output 410A in L2 memory FIFO 416A until output 410B arrives in L2 memory FIFO 416B. When output 410B arrives in L2 memory FIFO 416B, the GPU verifies data and the storage address of data included in output 410A and output 410B. If the verification is successful, the GPU may propagate the data from output 410A or output 410B (whichever is designated as a primary output using tags 408) for storage in the memory system.

In an embodiment, L2 memory FIFO 416 may also store loads that are consumed by computations 404 executing on compute unit 406 (not shown). When a load is stored in L2 memory FIFO 416, the load is stored until all computations 404 consume the data. For example, computations 404A and 404B may request a load while they execute on compute unit 406A and 406B. The requested load is retrieved from the memory storage and is pinned in L2 memory FIFO 416 until computations 404A and 404B consume the input data. Moreover, subsequent requests for the load will cause the GPU to retrieve the load from L2 memory FIFO 416 and not the system memory. Once computations 404A and 404B consume the load, the GPU may remove the input data from L2 memory FIFO 416.

(b) Method

Figure 5:
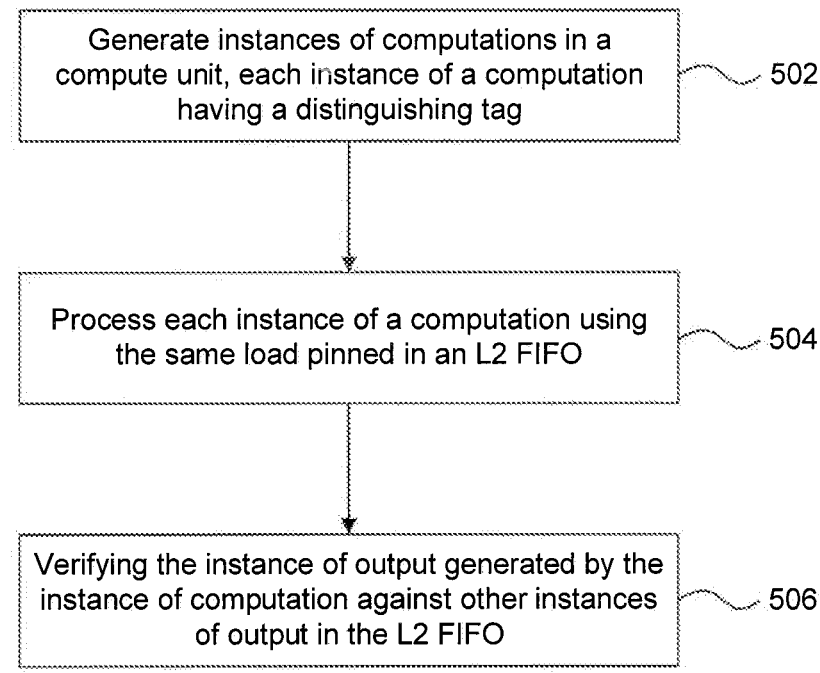
FIG. 5 is a flowchart of a method for verifying instances of computation in a buffer leading to a memory cache of a GPU, according to an embodiment.

FIG. 5 is a flowchart of a method 500 for verifying instances of computation in a buffer leading to a memory cache of a GPU, according to an embodiment.

At operation 502, instances of computation are generated. For example, control processor 402 generates instances of computation 404 from a workgroup, where each instance of computation 404 has a distinguishing tag 408. Once generated, control processor 402 dispatches each instance of computation 404 to a respective compute unit 406.

At operation 504, instances of computation are processed. For example, each instance of computation 404 is processed by a different compute unit 406. During processing, a load requested by the one computation 404 is stored in L2 FIFO 412 until it is requested and consumed by computation 404 executing on each compute unit 406. For example, when instance of computation 404 requests a load from the memory system, the load is stored in L2 FIFO 412. The load may be pinned in L2 FIFO 412 until the load requests are issued by other instances of computation 404. Once issued, the GPU retrieves the load from L2 FIFO 412 and replicates the load in compute units 406. Once replicated, the load is consumed by compute units 406. Additionally, each computation 404 generates output 410 that is stored in L2 FIFO 412 until the data and storage address in instances of output 410 are verified.

At operation 508, a store is verified. For example, the data and storage address of one instance of output 410 is verified against other instances of output in L2 FIFO 412. Instances of output 410 that have the same instances of computation 404 may be identified using tag 408. Instances of output 410 generated by instances of computation 404 are pinned in L2 FIFO 412 until verification completes. When the verification is successful, a primary instance of output 410 updates L2 cache 414 for storage in the memory system.

Figure 6:
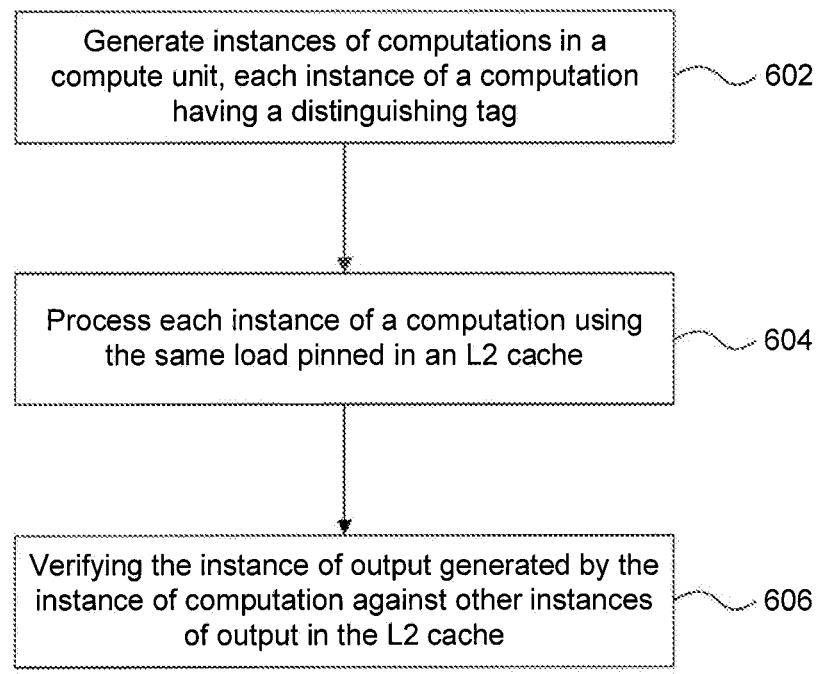
FIG. 6 is a flowchart of a method for verifying instances of computation in a memory cache of a GPU, according to an embodiment.

FIG. 6 is a flowchart of a method 600 for verifying instances of computation in a memory cache of a GPU, according to an embodiment.

At operation 602, instances of computation are generated. For example, control processor 402 generates instances of computation 404 from a workgroup, where each instance of computation 404 has a distinguishing tag 408. Once generated, control processor 402 dispatches each instance of computation 404 to a respective compute unit 406.

At operation 604, instances of computation are processed. For example, each instance of computation 404 is processed by a different compute unit 406. During processing, a load requested by the one instance of computation 404 is stored in L2 cache 414 until it is requested and consumed by other instances of computation 404 executing on each computer unit 406. For example, when instance of computation 404 requests a load from the memory system, the load is stored in L2 cache 414. The load may be pinned in L2 cache 414 until the load requests are issued by other instances of computation 404. Once issued, the GPU retrieves the load from L2 cache 414 and replicates the load in compute units 406. Once replicated, the load is consumed by compute units 406. Additionally, each instance of computation 404 generates output 410 that is stored in L2 cache 414 until the data and storage address in instance of output 410 is verified.

At operation 608, a store is verified. For example, the data and memory address of one instance of output 410 is verified against other instances of output in L2 cache 414. Instances of output 410 that have the same instances of computation 404 may be identified using tag 408. Instances of output 410 generated by instances of computation 404 are pinned in L2 cache 414 until verification completes. When the verification is successful, a single instance of output 410 updates L2 memory FIFO 416 for storage in the memory system. Also, because L2 cache 414 is accessible by other processors on the electronic device, instances of output 410 are quarantined from the other processors until verification completes.

Figure 7:
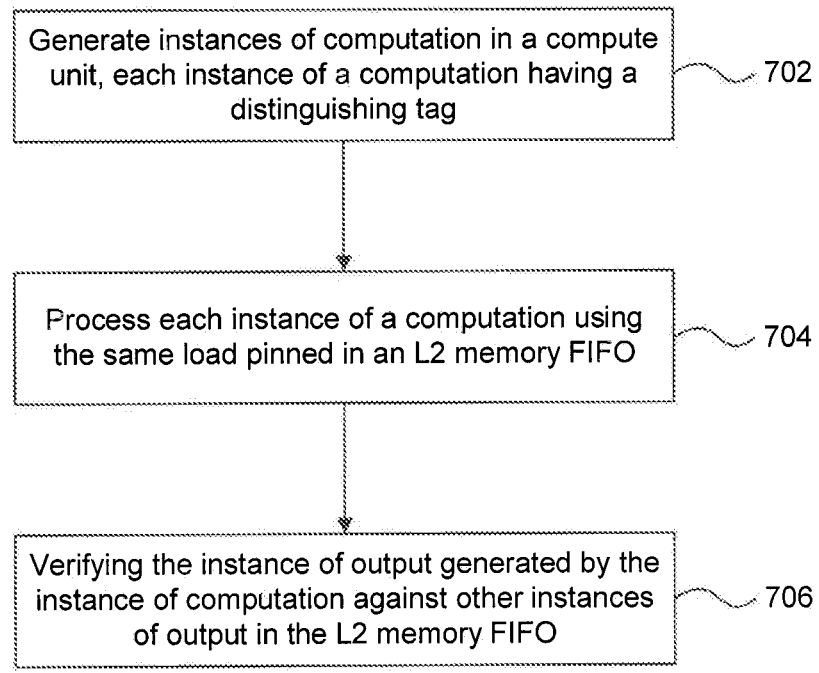
FIG. 7 is a flowchart of a method for verifying instances of computation in a memory cache leading to a system memory, according to an embodiment.

FIG. 7 is a flowchart of a method 700 verifying instances of computation in a memory cache leading to system memory, according to an embodiment.

At operation 702, instances of computation are generated. For example, control processor 402 generates instances of computation 404 from a workgroup, where each instance of computation 404 has a distinguishing tag 408. Once generated, control processor 402 dispatches each instance of computation 404 to a respective compute unit 406.

At operation 704, instances of computation are processed. For example, each instance of computation 404 is processed by compute unit 406. During processing, a load requested by the one computation 404 is stored in L2 memory FIFO 416 until it is requested and consumed by instances of computation 404 executing on each compute unit 406. For example, when instance of computation 404 requests a load from the memory system, the load is stored in L2 memory FIFO 416. The load may be pinned in L2 memory FIFO 416 until the load requests are issued by other instances of computation 404. Once issued, the GPU retrieves the load from L2 memory FIFO 116 and replicates the load in compute unit 406. Once replicated, the load is consumed by compute units 406. Additionally, each instance of computation 404 generates output 410 that is stored in L2 memory FIFO 416 until the data and memory address in output 410 is verified. Also, each instance of computation 404 generates output 410 that the GPU stores in a different location of L2 cache 414 so that output 410 generated by different instances of computation 404 does not overwrite output 410 stored in L2 cache 414 as it is propagated to L2 memory FIFO 416 for verification.

At operation 708, a store is verified. For example, the data and memory address of one instance of output 410 is verified against other instances of output in L2 memory FIFO 416. Instances of output 410 that have the same instances of computation 404 may be identified using tag 408. Instances of output 410 from instances of computation 404 are pinned in L2 memory FIFO 416 until verification completes. When verification is successful, a primary instance of output 410 updates the memory system.

3. CONCLUSION

Embodiments can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

In this document, the terms "computer program medium" and "computer-usable medium" are used to generally refer to media such as a removable storage unit or a hard disk drive. Computer program medium and computer-usable medium can also refer to memories, such as memory system and graphics memory which can be memory semiconductors (e.g., DRAMs, etc.). These computer program products are means for providing software to an APD.

The embodiments are also directed to computer program products comprising software stored on any computer-usable medium. Such software, when executed in one or more data processing devices, causes a data processing device(s) to operate as described herein or, as noted above, allows for the synthesis and/or manufacture of electronic devices (e.g., ASICs, or processors) to perform embodiments described herein. Embodiments employ any computer-usable or -readable medium, and any computer-usable or -readable storage medium known now or in the future. Examples of computer-usable or computer-readable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system comprising:
a hardware-based compute unit configured to perform operations comprising:
generating a first instance of computation and a second instance of computation, wherein the first and second instances of the computation are part of a workgroup comprising a plurality of wavefronts adapted for parallel execution;
processing the first instance of computation and the second instance of computation using a plurality of hardware-based processors in the compute unit, wherein the processing generates a first instance of output associated with the first instance of computation using a load and the second instance of output associated with the second instance of computation using the load; and
verifying accuracy of the first and second instances of output against each other in memory in the compute unit to ensure accuracy of output of the compute unit.

2. The system of claim 1, further comprising:
a memory buffer connected to a memory cache in the compute unit and further configured to store the first and second instances of output; and
wherein to verify the accuracy the compute unit is further configured to perform operations comprising:
identifying the first instance of output stored in the memory buffer;
identifying the second instance of output stored in the memory buffer;
comparing content of the first instance of output against content of the second instance of output; and
propagating the first instance or the second instance of output to permanent storage through the memory cache when comparison indicates the content of the first instance and the second instance of output is accurate.

3. The system of claim 2, wherein the compute unit is further configured to compare the content by:
comparing data of the first instance of output to data of the second instance of output; and
comparing a storage address for the data of the first instance of output to a storage address of the data of the second instance of output.

4. The system of claim 1, further comprising:
a memory cache in the compute unit, wherein the memory cache is configured to store the instances of output; and
wherein the compute unit is further configured to perform operations comprising:
identifying the first instance of output stored in the memory cache;
identifying the second instance of output stored in the memory cache;
comparing content of the first instance of output against content of the second instance of output; and
propagating the first instance of output or the second instance of output to permanent storage when comparison indicates the content of first instance and the second instance of output is accurate.

5. The system of claim 4, wherein the compute unit is further configured to compare the content by:
comparing data of the first instance of output to data of the second instance of output; and
comparing a storage address for storing the data in the permanent storage of the first instance of output to a storage address for storing the data in the permanent storage of the second instance of output.

6. The system of claim 1, wherein the first and second instances of computation include tags that differentiate the first instance of computation from the second instance of computation.

7. The system of claim 1, wherein the compute unit is further configured to:
store the load in the memory of the compute unit, wherein the load is accessible to the first and second instances of computation for consumption when the first and second instances of computation are processed by the plurality of hardware-based processors.

8. A system comprising:
a scheduler configured to perform operations comprising generating a first and second instances of computation, wherein the first and second instances include identical code;
a plurality of compute units configured to perform operations comprising:
processing the first and second instances of computation, wherein the first and second instances of computation are processed on different compute units, wherein the first and second instances of the computation are part of a workgroup comprising a plurality of wavefronts adapted for parallel execution; and
generating a first and second instances of output, the instance of output associated with the first instance of computation and the second instance of output associated with the second instance of computation; and
a verification hardware configured to perform operations comprising verifying accuracy of the first and second instances of output against each other in memory to ensure accuracy of the first and second instances of output, and
wherein the scheduler, the plurality of compute units, the verification hardware and the memory are included in a hardware-based processor.

9. The system of claim 8, wherein the hardware-based processor is a graphics processing unit.

10. The system of claim 8, further comprising:
a memory buffer connected to a memory cache of the hardware-based processor and configured to perform operations comprising storing the first and second instances of output; and
wherein the verification hardware is further configured to perform operations comprising:
identifying the first instance of output stored in the memory buffer;
identifying the second instance of output stored in the memory buffer;
comparing content of the first instance of output against the content of the second instance of output; and
propagating the first instance of output or the second instance of output to a permanent storage when comparison indicates the content of the first and second instance of output is accurate.

11. The system of claim 10, wherein the verification hardware is further configured to perform operations comprising:
comparing data of the first instance of output to data of the second instance of output; and
comparing a storage address for storing the data in the permanent storage of the first instance of output to a storage address for storing the data in the permanent storage of the second instance of output.

12. The system of claim 8, further comprising:
a memory cache in the hardware-based processor and configured to perform operations comprising storing the first and second instances of output; and
wherein the verification hardware is further configured to perform operations comprising:
identifying the first instance of output stored in the memory cache;
identifying the second instance of output stored in the memory cache;
comparing content of the first instance of output against content of the second instance of output; and
propagating the first instance of output or the second instance of output to a permanent storage when comparison indicates the content of the first and second instance of output is accurate.

13. The system of claim 12, wherein the verification hardware is further configured to perform operations comprising:
comparing data of the first instance of output to data of the second instance of output; and
comparing a storage address for storing the data in the permanent storage of the first instance of output to a storage address for storing the data in the permanent storage of the second instance of output.

14. The system of claim 8, wherein instances of computation include tags that differentiate the instance of computation from other instances of the computation.

15. The system of claim 14, wherein the verification hardware is further configured to perform operations comprising:
using a tag of a first instance of output and a tag of a second instance of output to calculate storage addresses for the first instance of output and the second instance of output, thereby ensuring the first instance of output and the second instance of output are stored in different addresses in a memory cache.

16. The system of claim 8, wherein the compute unit is further configured to perform operations comprising:
storing a load in the memory of the hardware-based processor, wherein the load is accessible to the first and second instances of computation for consumption when the first and second instances of computation are processed by the plurality of compute units.

17. A method comprising:
generating first and second instances of computation for processing in a hardware-based environment, wherein the first and second instances of the computation are part of a workgroup comprising a plurality of wavefronts adapted for parallel execution and include identical code;
processing the first and second instances of the computation in the hardware-based environment, wherein the processing generates a first instance of output associated with the first instance of computation and the second instance of output associated with the second instance of computation; and
verifying accuracy of the first and second instances of output against each other in memory in the hardware-based environment, to ensure accuracy of output of a hardware-based processor.

18. The method of claim 17, wherein the verifying further comprises:
identifying the first instance of output stored in memory, the first instance including a first tag;
identifying the second instance of output stored in memory, the second instance including a second tag; and
comparing content of the first instance of output against content of the second instance of output; and
propagating one of the first instance of output or the second instance of output to a permanent storage when the verification indicates the first instance of output and the second instance of output are accurate.

19. The method of claim 18, wherein the comparing further comprises:
- comparing data of the first instance of output to data of the second instance of output; and
- comparing a storage address for the data of the first instance of output to a storage address of the data of the second instance of output.

20. The method of claim 18, wherein the memory is a buffer to a memory cache in a compute unit.

21. The method of claim 18, wherein the memory is a memory cache in a compute unit.

22. The method of claim 18, wherein the memory is a buffer to a memory cache of a hardware-based processor accessible to a plurality of compute units.

23. The method of claim 18, wherein the memory is a memory cache of a hardware-based processor accessible to a plurality of compute units.

24. The method of claim 17, wherein the first and second instances of computation include tags that differentiate the first instance of computation from the second instances of computation.

25. The method of claim 24, further comprising:
- using a tag of the first instance of output and a tag of a second instance of output to calculate storage addresses for the first instance of output and the second instance of output, thereby ensuring the first instance of output and the second instance of output are stored in different addresses in a memory cache of a hardware-based processor.

26. The method of claim 17, further comprising:
- storing a load in the memory of a hardware-based processor, wherein the load is accessible to the first and second instances of the computation for consumption during the processing.

27. A method, comprising:
- converting a task configured for processing on a sequential processor, wherein the converting further comprises:
  - generating first and second instances of computation from the task, wherein the first and second instances of computation are configured for processing on a hardware-based parallel processor;
  - processing the first and second instances of the computation on the hardware-based parallel processor, wherein the processing generates a first instance of output associated with the first instance of computation based on a load and the second instance of output associated with the second instance of computation based on the load; and
  - verifying accuracy of the first and second instances of output against each other in memory in the hardware-based processor, to ensure accuracy of output of the hardware-based processor.

* * * * *